March 24, 1925.
C. S. JOHNSTON
1,531,008
VEHICLE WHEEL
Filed June 9, 1921
2 Sheets-Sheet 1
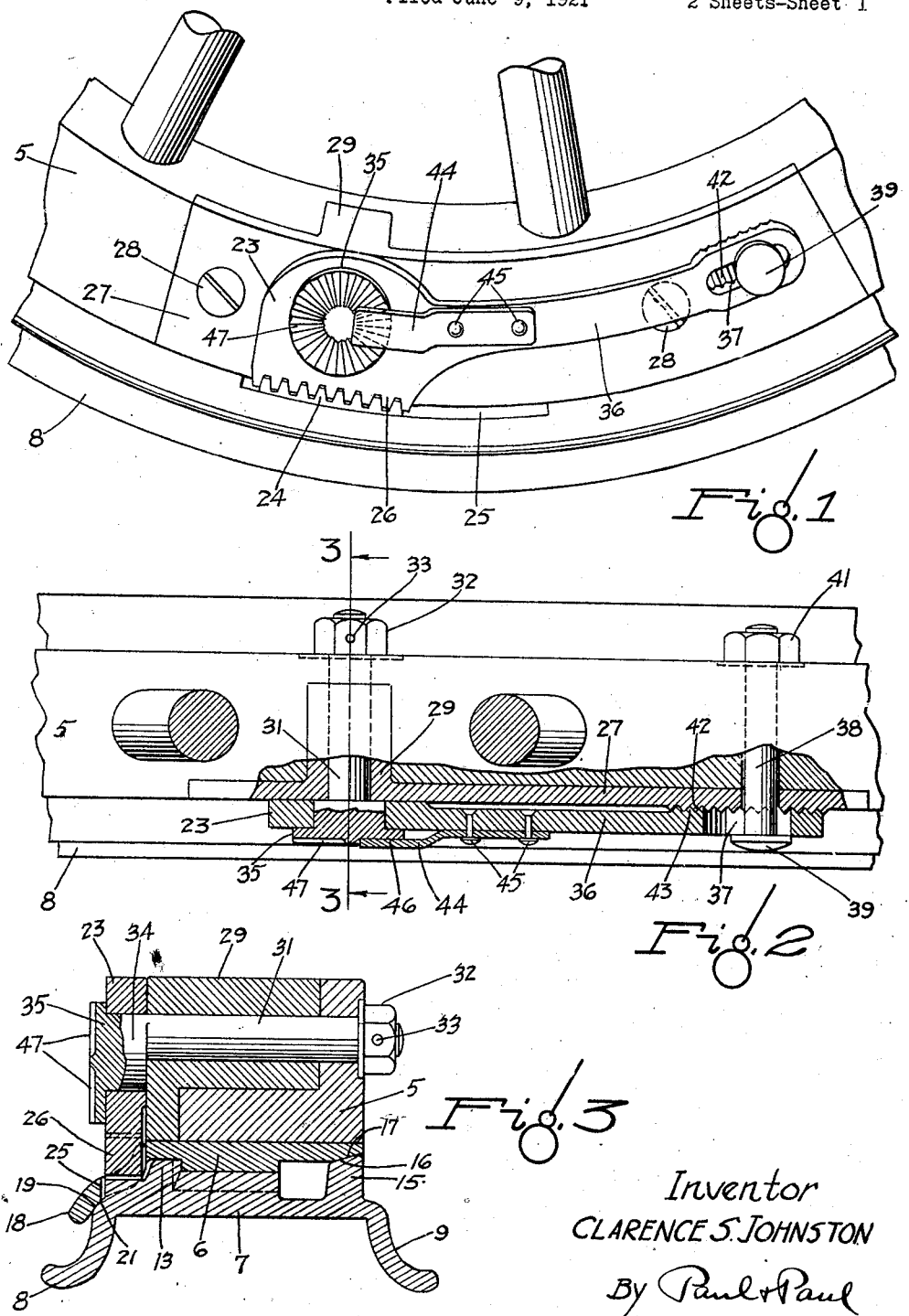
Inventor
CLARENCE S. JOHNSTON
By Paul & Paul
His Attorneys

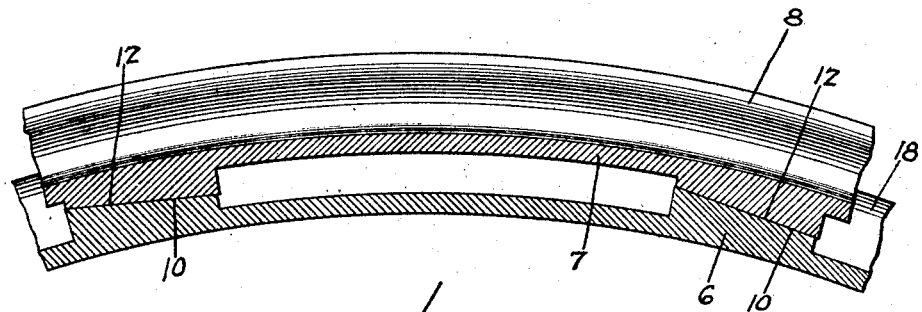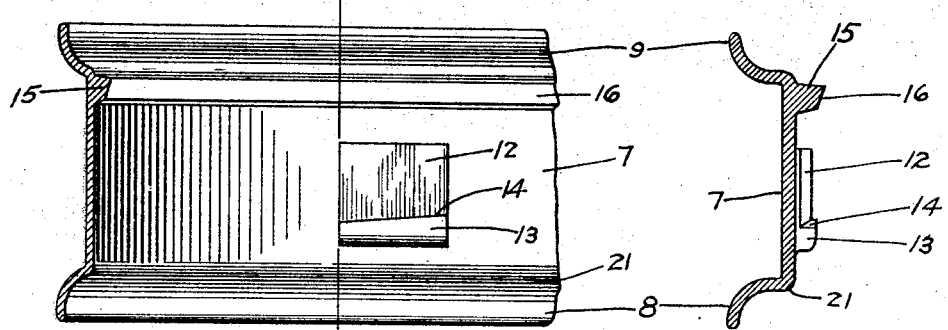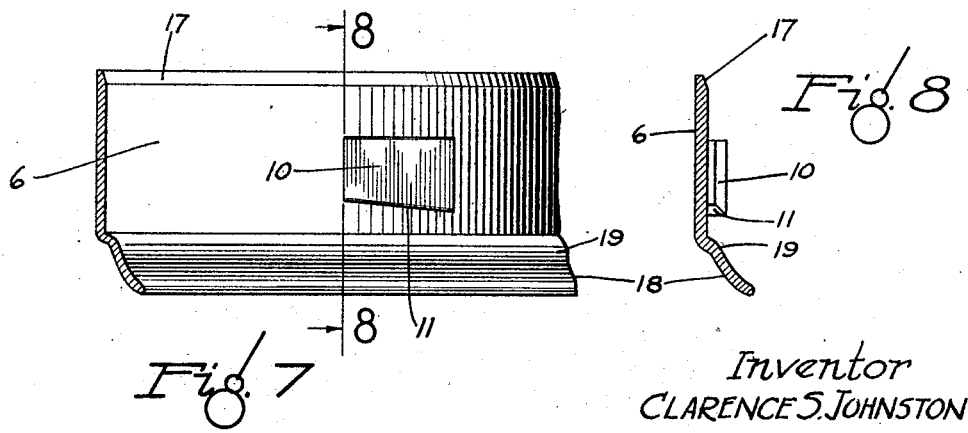

Patented Mar. 24, 1925.

1,531,008

UNITED STATES PATENT OFFICE.

CLARENCE S. JOHNSTON, OF GLENDIVE, MONTANA.

VEHICLE WHEEL.

Application filed June 9, 1921. Serial No. 476,206.

*To all whom it may concern:*

Be it known that I, CLARENCE S. JOHNSTON, a citizen of the United States, resident of Glendive, county of Dawson, State of Montana, have invented certain new and useful Improvements in Vehicle Wheels, of which the following is a specification.

This invention relates to improvements in vehicle wheels of the type employing what are generally known as demountable rims. It provides a novel and improved construction in which the demountable rim may be easily mounted on the wheel body and held in secure position thereon during use, and which may be released and easily demounted without disturbing the tire, usually pneumatic, which is secured to the rim.

It is admittedly old in this art to provide a wheel body with a fixed rim having peripherally disposed lugs and to employ in co-operation therewith a demountable rim adapted to circumscribe the fixed rim and to have a plurality of lugs disposed upon the inner face thereof whereby the lugs of the fixed and demountable rims are adapted to coact upon circumferential movement of the demountable rim relatively to the fixed rim. Such coaction causes the demountable rim to be held in frictionally locked operative position upon the fixed rim.

This invention more particularly relates to the means for moving the demountable rim relatively to the fixed rim and for retaining the demountable rim in locked operative position upon the fixed rim. It also relates to the improved rim and lug construction. Further, it may be noted that the present invention is in the general nature of improvements upon the structure disclosed in reissue Patent No. 14,723, granted to the inventor hereof, September 16, 1919.

The object of the invention, therefore, is to provide an improved vehicle wheel.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 1 shows in perspective side elevation a portion of a vehicle wheel embodying this invention;

Figure 2 is a plan view showing the inner face of the wheel felly, parts being broken away;

Figure 3 is a section on the line 3—3 of Figure 2;

Figure 4 is a longitudinal section through the fixed and demountable rims showing the coacting lugs in rim-locking position;

Figure 5 is a view in plan of a portion of the inner circumferential surface of the demountable rim;

Figure 6 is a cross section on the line 6—6 of Figure 5;

Figure 7 is a view in plan of a portion of the outer circumferential surface of the fixed rim; and Figure 8 is a cross section on the line 8—8 of Figure 7;

In the selected embodiment of the invention here disclosed, there is illustrated a wheel body which includes a felly 5 having secured thereto, in the usual manner, a fixed rim 6 adapted to receive in circumscribed position a demountable rim 7. The demountable rim is provided with the usual annular flanges 8 and 9 to receive a pneumatic tire in accordance with the common practice in this art. It is also well known in this art to provide lugs upon the demountable rim and upon the fixed rim arranged in coacting pairs.

The fixed rim is provided with elongated, preferably integral lugs projecting from the outer peripheral face thereof. Each lug is formed with a working surface 10 which is substantially tangential to the fixed rim periphery. One longitudinal edge 11 of this lug is outwardly inclined. A plurality of similar lugs are disposed in spaced relation about the periphery of the fixed rim.

The demountable rim is provided with a like number of elongated preferably integral lugs projecting from and similarly disposed about the inner peripheral face thereof. Each lug is formed with a working surface 12 oppositely and complementarily inclined to a working surface 10. A longitudinally extending and inwardly projecting marginal rib 13 is integrally formed on each demountable rim lug and the inner face 14 thereof is inwardly inclined complementarily to the edges 11 of the fixed rim lugs.

In addition to its lugs, the demountable rim 7 is provided with an inwardly and annularly projecting shoulder 15 having an inclined or beveled face 16; while the fixed rim is formed along one margin with an annularly beveled working face 17 co-operable with the face 16, and along its other margin with an annular flange 18 turned or flared away from the axis of the rim. The working surface of the flange 12 is provided by its curved portion 19.

When the demountable rim is placed upon the fixed rim, the former may be moved circumferentially with relation to the latter by suitable means such as that hereinafter described. When the demountable rim is so positioned and so moved, it moves axially and radially into locked or wedged position both by reason of the coaction of the inclined working surfaces 10 and 12 and also by the slight axial movement imparted to the demountable rim by the coaction of the edges 11 of the fixed rim lugs with the inner faces 14 of the ribs 13 of the demountable rim lugs. Such induced axial movement is restricted by the engagement of the working surface of the annular portion 19 of the fixed rim flange with the adjacently presented annular surface 21 of the flange 8 of the demountable rim and of the beveled faces 16 and 17. Reversal of circumferential movement functions to cause release of the demountable rim from the fixed rim. It may be noted that the axial movement of the demountable rim is relatively slight but may, of course, be raised by changing the angular relation of the coacting inclined faces 14 and edges 11 of the lugs of the demountable and fixed rims respectively.

The movement of the demountable rim relatively to the fixed rim is effected by means movably mounted upon the wheel body and adapted to engage the demountable rim to move the same circumferentially. This rim-engaging and moving means includes a plate 23, preferably metallic, which is mounted upon the wheel body so that it may be moved into engagement with the demountable rim and may drive the demountable rim in either circumferential direction. The plate 23 and demountable rim 7 are provided with co-operable serrated portions. The rim 7 is provided with a preferably integral and circumferentially elongated rack 24 projecting substantially radially inwardly from one side thereof. This rack 24 is adapted to project through, and to be longitudinally movable in, an elongated aperture or slot 25 formed in the flange 18 of the fixed rim 6. The slot 25 is of greater length than the rack 24 to permit longitudinal movement of the latter therein. When the demountable rim 7 is placed upon the fixed rim, this rack is inserted through the slot in a position to be engaged by the teeth 26 provided upon the lower edge portion of the movable plate 23.

The working travel of this plate is accomplished by an eccentric movement. A metallic block 27 is secured, as by screws 28, in a suitable recess in the wheel body. The block is formed with an inwardly projecting bearing portion 29 in which is rotatably borne the shaft 31. A nut 32 is fixed to this shaft adjacent one end by a pin 33 so that the rotation of the shaft may be effected by the turning of the nut. The nut turning is accomplished by means of the usual nut wrenches. Adjacent the other end of this shaft 31 is a circular member 34 preferably integral with, and eccentric to, the shaft. The shaft terminates in an enlarged head 35. The plate 23 is provided with a circular aperture through which the shaft is inserted upon assembly and within which aperture the eccentric member 34 bears against the annular portion of the plate adjacent its aperture, and, upon placement of the nut 32, the parts are held in assembled operative relation on the wheel body. The adjacent faces of the plate 23 and the block 27 are preferably polished to reduce friction upon movement of the plate with relation to the block. The plate is provided with an arm 36 extending therefrom and preferably integral therewith. The terminal portion of this arm is mounted upon the block with a pin and slot connection to permit both a sliding movement and a rocking movement of the arm with relation to the block. The arm is formed with a slot 37 through which projects the pin or bolt 38 having an integral head 39 adjacent the slot to hold the arm in operative position and having a nut 41 received in threaded engagement upon its other end projecting through the wheel felly 5.

A means for locking this arm to the block against relative movement is had by providing teeth 42 on the outer face of the block which are adapted to engage teeth 43 on the adjacently presented inner face of the arm. When the nut 41 is turned inwardly upon the bolt 38, the bolt forces the arm teeth 43 into engagement with the block teeth 42 and thereby relative movement between the plate and arm is prevented. Release of the nut 41 permits disengagement of the teeth 43 and 42 whereupon the arm 36 may move.

In the working position of the demountable rim shown in Figures 1 and 2, such rim has been moved circumferentially by the plate so that the coacting lugs of the two rims have imparted a transverse or axial movement to the demountable rim so that it is wedged in working position. In this working position the plate is shown as locked against movement by the toothed locking device adjacent the pin and slot connection of the plate arm. A further locking means is provided by means of the latch 44 formed of a strip of spring metal carried on the arm 36 by rivets 45. The free end of the latch is provided with an integral tooth 46 which is tensionably pressed into engagement with one of the plurality of teeth 47 formed radially upon the outer face of the enlarged head 35 of the shaft 31. This latch resiliently holds the shaft against rotation due to vibrations and jars under working conditions, but permits rotation of the shaft when the usual wrench is applied to the nut 32.

The removal of the demountable rim is effected by unscrewing the locking nut 41 so that the co-operable teeth 43 of the block 27 and teeth 43 of the arm 36 may be released. The nut 32 may then be turned to cause rotation of the shaft 31 which effects, through the eccentricity of the plate mounting, movement of the plate 23 to the right of its position shown in Figure 1. Such movement of the plate imparts relative circumferential movement to the demountable rim 6 in a similar direction thereby causing, by means of the coacting lugs, release of the demountable rim from its frictional engagement with the fixed rim. Further movement of the shaft 31 causes the plate teeth to be lifted in a radial direction from the rack of the demountable rim. In such released position the demountable rim may be easily removed.

I claim as my invention:

1. A vehicle wheel including a wheel body, a fixed rim on the body, a demountable rim, lugs on the fixed and demountable rims which coact when the demountable rim is moved circumferentially, the fixed rim having a circumferentially elongated aperture, a serrated member on the demountable rim adapted to project through the aperture, and co-operable serrated means on the body arranged to move into and out of engagement with the serrated member and, when in engagement with the member to move said demountable rim in either direction circumferentially of the body.

2. A vehicle wheel including a wheel body, a fixed rim on the body, a demountable rim, lugs on the fixed and demountable rims which co-act when the demountable rim is moved circumferentially, a plate movably mounted on the body, means for moving the plate into engagement with the demountable rim and thereafter to move said rim circumferentially, co-operable teeth on the plate and body, and means adapted to retain said teeth in engagement whereby the plate may be held in locked position on the body.

3. A vehicle wheel including a wheel body, a fixed rim on the body, a demountable rim, lugs on the fixed and demountable rim which coact when the demountable rim is moved circumferentially, a shaft rotatably journaled in and extending transversely through the wheel body, a plate eccentrically mounted on the shaft adjacent one end and adapted to engage and move the demountable rim, and means on the other end of the shaft whereby the shaft may be rotated and the plate caused to engage and move the demountable rim circumferentially.

4. A vehicle wheel including a wheel body, a fixed rim on the body, a demountable rim, lugs on the fixed and demountable rims which coact when the demountable rim is moved circumferentially, a shaft rotatably borne in said body, a plate eccentrically mounted upon the shaft whereby, upon rotation of the shaft, the plate is moved into engagement with the demountable rim and the rim thereafter moved circumferentially, a radially toothed head on said shaft, and a resilient toothed latch adapted yieldably to prevent rotation of the shaft.

In witness whereof, I have hereunto set my hand this 31st day of May, 1921.

CLARENCE S. JOHNSTON.